US006801960B1

(12) United States Patent
Ericson et al.

(10) Patent No.: US 6,801,960 B1
(45) Date of Patent: Oct. 5, 2004

(54) SWITCH-BASED ACCELERATION OF COMPUTER DATA STORAGE EMPLOYING AGGREGATIONS OF DISK ARRAYS

(75) Inventors: George M. Ericson, Shrewsbury, MA (US); Robert C. Solomon, Kensington, NH (US); Jeffrey A. Brown, Shrewsbury, MA (US); John E. Haynes, Jr., South Weymouth, MA (US)

(73) Assignee: EMC Corporation, Hopkinton, MA (US)

( * ) Notice: Subject to any disclaimer, the term of this patent is extended or adjusted under 35 U.S.C. 154(b) by 470 days.

(21) Appl. No.: 09/670,933

(22) Filed: Sep. 28, 2000

(51) Int. Cl.$^7$ .............................................. G06F 13/00
(52) U.S. Cl. ....................... 710/33; 710/30; 713/160; 713/190
(58) Field of Search ............................... 710/2, 29, 30, 710/33; 713/153, 160, 162, 190

(56) References Cited

U.S. PATENT DOCUMENTS

| | | | |
|---|---|---|---|
| 5,838,891 A | | 11/1998 | Mizuno et al. ......... 395/182.03 |
| 5,938,736 A | * | 8/1999 | Muller et al. ................ 709/243 |
| 6,148,421 A | * | 11/2000 | Hoese et al. ................... 714/50 |
| 6,338,110 B1 | * | 1/2002 | van Cruyningen ........... 710/317 |
| 6,351,838 B1 | * | 2/2002 | Amelia ........................ 714/770 |
| 6,370,605 B1 | * | 4/2002 | Chong, Jr. .................... 710/33 |
| 6,401,170 B1 | | 6/2002 | Griffith et al. .............. 711/114 |
| 6,601,101 B1 | * | 7/2003 | Lee et al. .................... 709/227 |

FOREIGN PATENT DOCUMENTS

| | | | | |
|---|---|---|---|---|
| WO | WO 98/36537 | 8/1998 | ............ | H04L/12/44 |
| WO | WO 02/27494 A2 | 4/2002 | ............ | G06F/12/00 |

OTHER PUBLICATIONS

International Preliminary Examination Report, International Application No.: PCT/US01/29264, Completion Date: Jan. 25, 2003, 6 Pages.

IBM Technical Disclosure Bulletin; vol. 38; No. 12; Dec. 1995; pp. 267–269.

Abstract —Edward M. Frymoyer; *Fibre Channel Application Profiles, FCSI and FCA*, Hewlett Packard/FCSI; 1994 IEEE; pp. 83–92.

Article —Connectivity; *Creating Server–Storage Networks Using Fibre Channel Switching Fabrics*; vol.: XVII; No. 6; p. 24.

International Search Report from International Application No. PCT/US 01/29264; filed Sep. 18, 2001; 7 Pages.

* cited by examiner

Primary Examiner—Jeffrey Gaffin
Assistant Examiner—Eron Sorrell
(74) Attorney, Agent, or Firm—Chapin & Huang, LLC; David E. Huang, Esq.

(57) ABSTRACT

There is disclosed apparatus and methodology for enhancing computer system data transfer when writing to network attached storage systems employing FC-2 fibrechannel protocol by dynamically reconfiguring a fibrechannel switch in response to map/unmap command controls issued by a disk drive aggregator. The reconfiguration involves fabrication of a dynamic map table having sets of fibrechannel FC-2 header fields and their corresponding new or proxy destination IDs (which correspond to the switch's output ports), and fabrication of both an input frame header buffer for temporary storage purposes and a frame header field selector (which can be a frame header mask) containing only relevant information. The input frame header is temporarily stored in the buffer and the field selector is used to obtain a "distilled" input header which is compared with the dynamic map table of stored header fields to obtain a match. If one of the sets of header fields matches the distilled input header, its corresponding proxy destination or source ID is substituted into the corresponding FC-2 input frame header's destination ID field, whereby write command data transfers are accomplished between host computer and a particular disk drive directly, avoiding the aggregator and latency otherwise introduced by the aggregator. Similar disclosure is provided for read command data.

25 Claims, 7 Drawing Sheets

SWITCH-BASED ACCELERATION OF COMPUTER DATA STORAGE EMPLOYING AGGREGATIONS OF DISK ARRAYS

FIELD OF THE INVENTION

The present invention relates generally to computer data storage systems and, more particularly, relates to acceleration of computer data storage utilizing fibrechannel switches, disk drive aggregators, and arrays of disk drives.

BACKGROUND OF THE INVENTION

Computer systems are pervasive in our society and virtually all human activity is now influenced at least to some extent by existence and usage of these systems. The faster and more efficient these systems are, the better for all concerned. Certain computer systems developing within the technological area known as fibrechannel or fibrechannel networks do offer faster and more efficient operation, not only because of their optically-communicative capability but for other reasons as well. One of the configurations in fibrechannel networks employs multiple disk drive arrays for data storage managed by an aggregator (essentially another array but with much higher intelligence than ordinary arrays and which organizes ordinary arrays into "aggregations") in combination with a fibrechannel switch (another intelligent device which performs a complex switching function under control of at least the aggregator). Typical inter-relationships of computer, aggregator, switch, and storage within fibrechannel networking have been established.

Referring to FIG. 1, there is depicted one typical fibrechannel computer system arrangement. Computer hosts 101, 102, and 103 communicate through fibrechannel switch or hub 104, sometimes known as a "fabric". The term "fabric" suggests densely-packed multiple conductors, since internal fibrechannel switch connections can be very dense. The irregularly-shaped "cloud" symbol representing the switch implies an active or changeable entity which is capable of being used or controlled. Front end fabric 104 connects to aggregator 105 (typically a RAID system, standing for Redundant Array of Independent/Inexpensive Disks) which, in turn, connects to back end fabric 106 (another fibrechannel switch or hub) to which are connected multiple disk drives 107, 108, 109, and 110. A major goal of this system is efficient movement of data or computer information from hosts to disk drive storage and vice-versa. If all computers communicate directly with all disk drives (and there can be many more than three hosts and four drives, those numbers being represented here only for purposes of clarity of illustration) then highly complex and inefficient operation with multiple hosts competing for the same storage space on the same disk drives, etc. can result. Thus, an aggregator is used to allow communication by computers with drives, but only through the aggregator to improve operation. The aggregator is a highly intelligent and complex device which appears to computers such as hosts 101, 102, and 103 to be a number of disk drives. The aggregator further appears to the computers to be the only disk drives in the system since it "hides" disk drives 107–110 connected to the back end fabric. This reduces complexity for computer hosts to a great extent. Further, this introduces a degree of security since all commands relative to data stored on disk drives from hosts must pass through, and thus be "approved" by, the aggregator. Any illegitimate command or operation may be stopped by the aggregator before it does damage. But, unfortunately, the aggregator can become a bottleneck in this configuration between computers and disk drives under certain high-traffic or busy or other conditions. Thus, the aggregating device can introduce "latency" or time delay into system operation and contribute to the very inefficiencies in system operation that it was designed to reduce or eliminate. Under certain circumstances, this can be a serious problem.

However, if the back end drives were directly accessible via the front end fabric, the aggregation "bottleneck" would be removed and certain reductions in these latencies might be achieved. In FIG. 2, Host computers 201, 202, and 203 are shown connected to front end fabric—fibrechannel switch 204 to which are also connected aggregator 208 and disk drives 205, 206, and 207. It is to be understood that the number of hosts and drives are not limited to the specific number shown and that many more, or fewer, hosts and drives are intended to be represented by this diagram. In operation, any one or more of the hosts first sends data requests to the aggregator which then enables the disk drives and alerts them that these requests are coming directly to any one or more of them. Then hosts send multiple requests addressed to the disk drives through the switch directly to these different drives, accessing these drives in parallel and receiving directly back is multiple data streams in parallel through the switch, which reduces the latency factor by eliminating at least one "hop"through the aggregator. However this configuration reintroduces the security issue, because these drives, not being "protected" by the aggregator, are more exposed to illegitimate commands in this configuration. Thus, disk drives and computers in this configuration have to contain added intelligence to deal with these security issues and the task of adding this intelligence creates a more complicated and less desirable environment.

Referring next to the subject of fibrechannel protocols as further useful background information, a book entitled "Fibre Channel Volume 1 The Basics" by Gary R. Stephens and Jan V. Dedek, published by Ancot Corp, Menlo Park, Calif., first edition June, 1995, is incorporated by reference herein. Within the computer industry there are highly competitive companies which specialize in design, development and manufacture of these switches, aggregators, memory arrays, and other fibrechannel related components. If their respective designs are to be employed in the same system, or if multiple systems employing their various designs are networked together, these designs have to mesh together properly for users to derive any benefit from them. This is accomplished by having these companies agree to certain standards sometimes generically known as the "ANSI Fibre Channel Standard". These standards are complex and are negotiated into existence by the very companies that are responsible for creating these fibrechannel-related components. One of the agreedupon products of these negotiations is what is sometimes called the "protocol stack"—five network levels of fibrechannel. (In computer networks, information or data sent between network devices is conducted on a physical level normally by electrons or photons over copper wires or fibre-optic paths respectively, and/or by telecommunication paths, and, at the same time, is also virtually conducted on multiple other network levels above the physical level.) Referring to FIG. 3A, five levels: FC-0, FC-1, FC-2, FC-3 and FC-4 are shown, corresponding to: physical, encode/decode (8B/10B), Framing Protocol, Common Services for Ports, and Mapping respectively. {Sometimes, another sixth layer, Upper Layer Protocol, is referred to, and is shown.} Briefly, the FC-0 functional level relates to physical connection of nodes, either optical or electrical—the nuts and bolts of connection. The FC-1 functional level relates to how information is transmitted between fibrechannel input/output ports, i.e. how lasers and electrical drivers/receivers deal with a bit stream moving into and out from a fiber. The FC-2 functional level deals with transferring information and is concerned with its content, proper arrival of content or detection of missing information or information errors; this level thus defines frame fields including frame header field layout and is utilized in embodiments of the present invention. The FC-3 functional level deals with common services that can be shared among ports. And, the FC-4 functional level handles mapping of existing non-fibrechannel interfaces for use on fibrechannel by using fibrechannel tools.

The foregoing latency problem of the prior art is addressed and relieved, without reducing security, by the welcome arrival of the present invention which operates not only within parameters of the ANSI Fibre Channel Standard, but, as suggested, makes novel use of fibrechannel level FC-2, as described hereinbelow.

SUMMARY OF THE INVENTION

The present invention in a broad aspect relates to a network-attached storage computer system having disk drives and an aggregator attached to the network. Direct or indirect data transfer between computer and disk drives is determined by its impact on overall performance of the system. If determined that indirect transfer would increase overall system performance compared to direct transfer, data is sent between computer and disk drives through the network and through the aggregator. If determined that direct transfer would increase overall system performance compared to indirect transfer, data is sent between computer and disk drives through the network but not through the aggregator.

The present invention in another aspect relates to a computer data storage system wherein data is grouped in frames. There are disk drives or the like for storing and retrieving data and an aggregator or data storage manager for managing operation of the disk drives. Each of the frames includes a frame header which designates parameters associated with data in its frame. One of the parameters is destination ID (identity of the destination). There is a controllable switch connected between computer, disk drives, and aggregator for selecting certain frames and flowing data in those selected frames directly between computer and disk drives. The aggregator is destination ID in the selected frames, but transfer of data in the selected frames between computer and disk drives is direct and not through the aggregator. Thus, latency issues can be reduced or eliminated because of direct flow of data between computer and disk drives, while at the same time not reducing security since the destination ID for data in the selected frames remains the aggregator.

In a further feature of the present invention, the switch includes switch control logic under command of the aggregator to select those frames to be transferred directly. The switch control logic includes a frame header field selector such as a frame header mask, an input frame header buffer, and a map table.

In yet another aspect, the present invention is incorporated in a computer system including both disk drives or the like for storing and retrieving data grouped in frames and an aggregator normally in the path of the frames flowing between computer and disk drives. The present invention employs computer logic and relates to enhancing transfer of data between computer and disk drives. This involves establishing a frame header field selector such as a mask containing only relevant information. The frames including their respective headers are received from the computer, and headers and mask are compared to obtain "distilled" frame headers. A map table is established which contains sets of frame header fields corresponding to input addresses (proxy destination IDs) of the disk drives. The map table is searched to find matches between distilled frame headers and sets of frame header fields. For each match, a proxy destination ID is substituted in place of the original destination ID in headers of each of the corresponding frames which are then forwarded directly to the disk drives and not via the aggregator. This data transfer enhancement operation is not perceptible by the host computer.

And in yet another aspect, the present invention relates to a computer program product for use in a computer system employing network-attached storage having both disk drives and a disk drive aggregator attached to the network. There is included a computer usable medium having computer readable program code thereon for enhancing the transfer of data between the computer and the disk drives.

It is thus advantageous to use the present invention to reduce latency issues without negatively impacting data security in a network-attached-storage-based computer system.

It is a general object of the present invention to provide increased overall system performance in a computer system.

If is a further object of the present invention to provide improved performance in storage and retrieval of data in a computer system, including a network-attached-storage computer system.

It is an additional object of the present invention to provide apparatus and methodology for allowing direct data flow between a computer system's host computers and disk drives under certain conditions while maintaining data security.

It is a still further object of the present invention to provide an improved fibrechannel-based computer system employing multiple disk drives wherein latency normally introduced by bottleneck-operation of an aggregator is reduced or eliminated.

Other objects and advantages will be understood after referring to the detailed description of the preferred embodiments and to the appended drawings wherein:

DESCRIPTION OF THE PREFERRED EMBODIMENTS

FIG. 3B

Figures 3A, 3B, 3C:
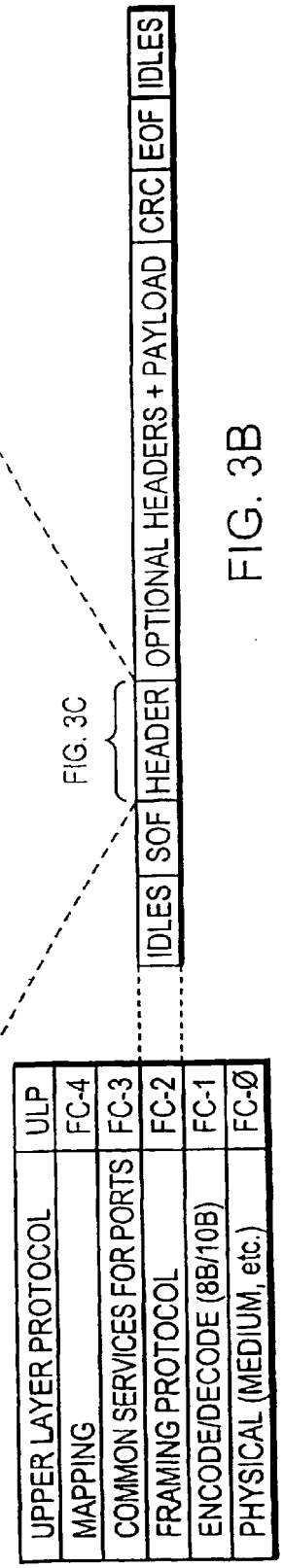
FIG. 3A depicts the fibrechannel levels with their respective designations.
FIG. 3B depicts a layout of a typical frame in accordance with fibrechannel level FC-2.
FIG. 3C depicts a layout of at least a portion of the fibrechannel level FC-2 frame header of FIG. 3B.

Referring to FIG. 3B, a typical fibrechannel frame in accordance with level FC-2 of the fibrechannel protocol stack is shown. This frame contains multiple fields which normally contain predetermined ranges of bytes. Typically the opening "idles"field has six transmission words or 24 bytes; "start of frame"(SOF) field has one transmission word or four bytes; the "header" field has six transmission words or 24 bytes and is of primary interest because it relates to the present invention and contains information about its frame's contents or purpose, somewhat analogous to ID/origin/destination information displayed on a human-transit bus above the bus driver's windshield; the "optional headers and payload" field can be the largest field ranging from zero to 528 transmission words or 2112 bytes; "cyclic redundancy check" (CRC) and "end of frame" (EOF) fields are each one transmission word of four bytes each; and closing "idles" field is again six transmission words or 24 bytes.

FIG. 3C

Figure 1:
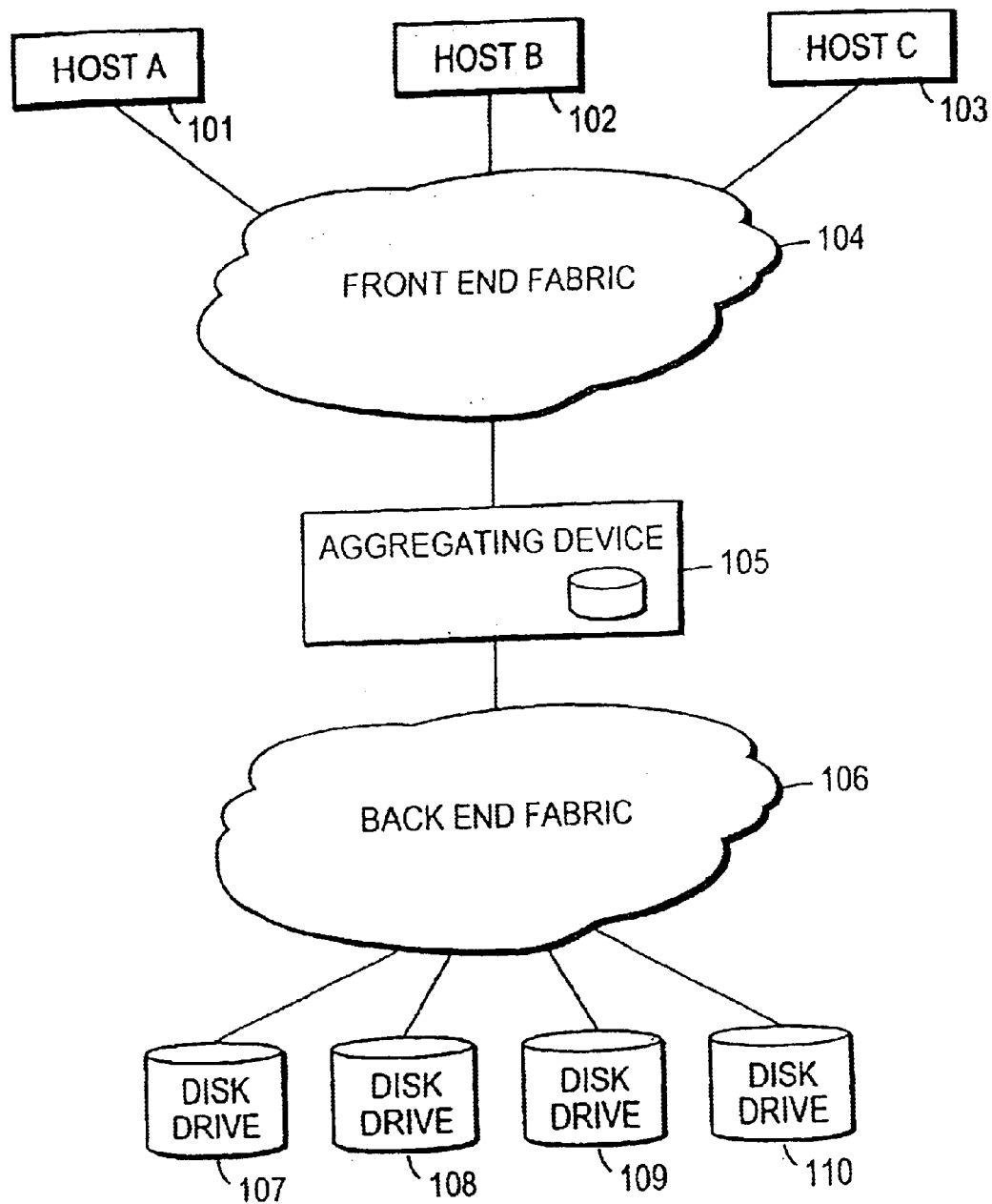
FIG. 1 is a diagram of a prior art arrangement of host computers, fibrechannel switches, aggregator, and disk drives.
Figure 2:
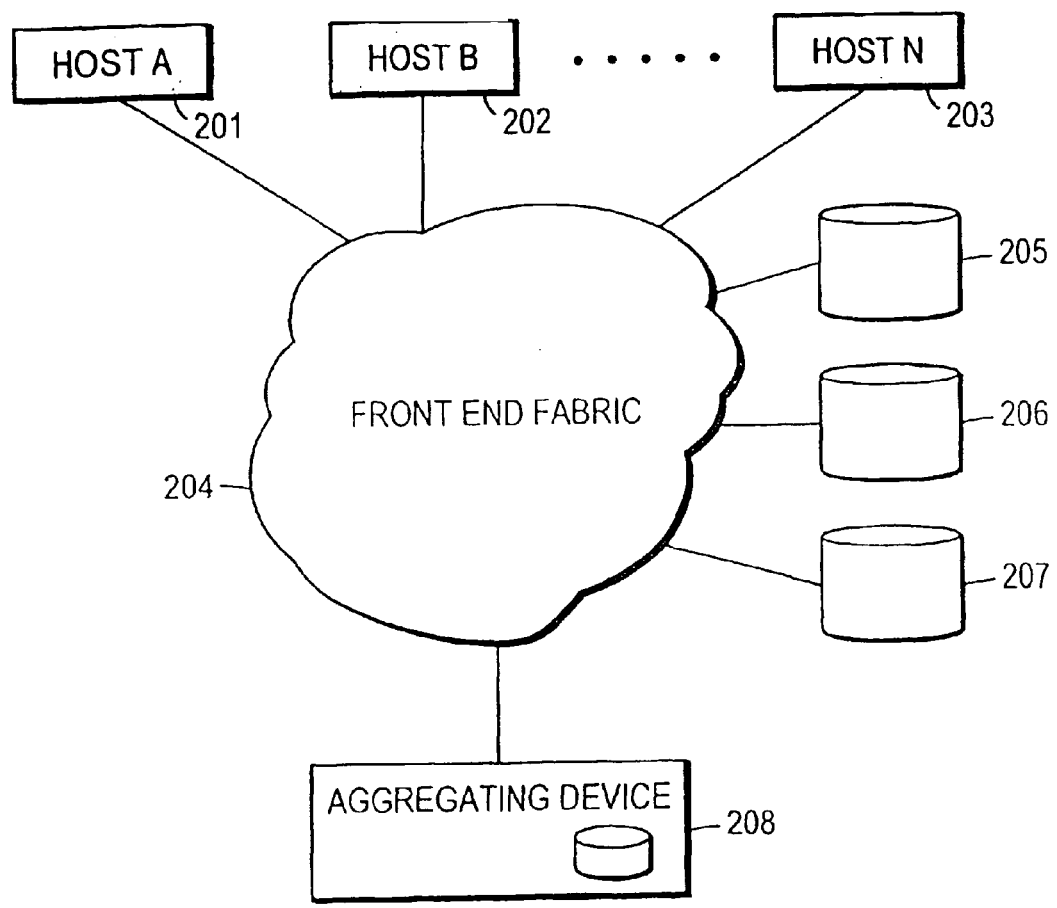
FIG. 2 is a diagram of another prior art arrangement of host computers; fibrechannel switch, aggregator, and drives.

Referring to FIG. 3C, the frame header of FIG. 2 is expanded to show the five words of interest in this header, the number of bytes per header (four) and various fields associated with particular bytes. The header actually contains six words. Starting at the left-hand side, R_CTL is "routing control" represented by byte zero. D_ID is "destination identity" represented by bytes 1–3. Byte 4 is not used. S_ID is "source identity" and is designated by bytes 5–7. Byte 8 is "type". F_CTL is "frame control" and is designated by bytes 9, A, B. SEQ_ID is "sequence identity" and is byte C. DF_CTL is "data field control" and is byte D. SEQ_CNT is "sequence count" and is designated by bytes E and F. OX_ID is "originator's identity" and is designated by bytes 10–11. Finally, RX_ID is "receiver's identity" and is designated by bytes 12–13. The D_ID, S_ID, and OX_ID fields in this header are utilized by embodiments of the present invention. Other fields may also be used and are selected by the frame header field selector such as a mask or its equivalent. These specific fields and these other fields shall be described more fully hereinbelow.

FIG. 4

Figure 4:
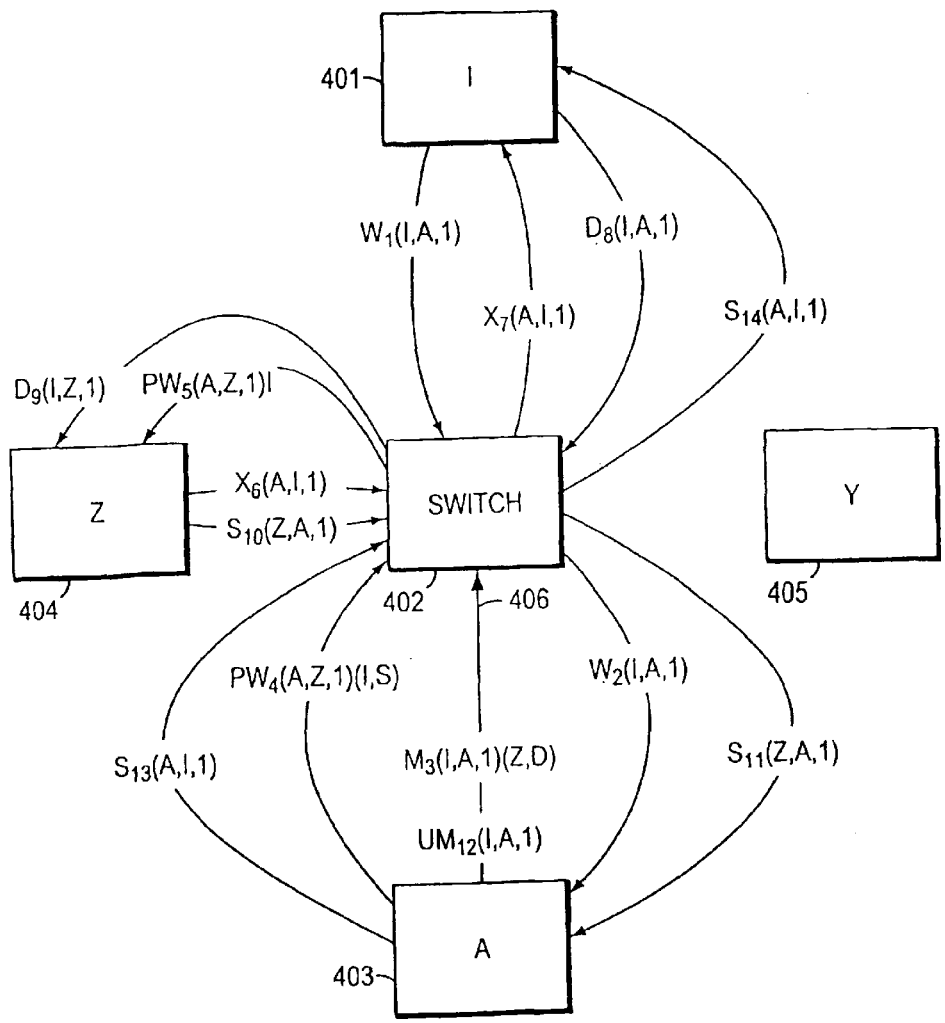
FIG. 4 is a schematic diagram of a write command processed in accordance with an embodiment of the present invention.

Referring to FIG. 4, a schematic block diagram of a computer system operating in accordance with an illustrative embodiment of the present invention is presented. Host computer 401 is labeled "I" for "initiator"; fibrechannel switch 402 is identified and shown as a box rather than a cloud only for purposes of convenience of illustration; aggregator 403 is labeled "A"; memory array or disk drive group 404 is labeled "Z", and memory array or disk drive group 405 is labeled "Y". These system components are shown as being interconnected by communication paths which are syntactically identified for purposes of ease of description. The syntax is as follows:

Command N(S_ID, D_ID, OX_ID)(Proxy x_ID, x) where "Command" is either a "read" from or "write" to memory with respect to host 401, "N " is a number representing communication count in this particular group or exchange of communications, "S" represents source of the command, "D" represents destination of the command, "OX" represents originator's exchange , "Proxy x" represents a substituted source or destination command where "x" represents either substituted source S or substituted destination D, and "ID" stands for the respective component's identity in each case.

Write Command Operation

In operation, host computer 401 issues a write request or command with syntax label W1(I, A, 1) which stands for: W=Write command; 1=this is the first communication in this particular exchange of communications designated "1" and pertaining to this Write command; (I=S_ID; A=D_ID; 1=OX_ID). Switch 402 receives W1(I, A, 1) at one of its input ports (not shown in this FIG.) and transfers it through to aggregator 403 via communication path syntactically labeled W2(I, A, 1) which is essentially a continuation of W1(I, A, 1). In response to W2(I, A, 1) aggregator 403 issues two commands: a mapping command and a proxy write command. Map command M3(I, A, 1)(Z,D) is forwarded to switch 402 over command input port 406 where it commands a mapping function within the switch (to be discussed below). Proxy write command PW4(A, Z, 1)(I, S) is also forwarded to switch 402 where it is switched to disk drive Z via the line syntactically labeled PW5(A, Z, 1)(I, S).

Before proceeding further with the syntactical narrative of FIG. 4, consider what has been thus far represented: A write request is issued by the host computer—it wishes to write data into a disk drive. It sends the request to the aggregator (via the switch) which is in charge of efficiently managing disk drive resources available to the computer. Upon receipt of this write request, the aggregator not only "decides" that this request should be directed to disk drive Z rather than disk drive Y, but also "decides" that it would be in the system's best interests if future communications from Host 401 with respect to this particular write request not proceed through the aggregator. Therefore, the aggregator issues a map command to the switch to generate a frame header mask and a map table (both shown in FIG. 7 and to be discussed below) for purposes of diverting certain future communications from initiator 401 to substitute or proxy destination disk drive Z (also to be discussed in detail below). The aggregator further issues a Proxy write command PW4(A, Z, 1)(I, S) to communicate to disk drive Z a proxy or substitute source ID, namely that of initiator "I" rather than its own ID. Accordingly, at this point in the communication proceedings for this write command, (1) the switch has been commanded to forward future communications from I for this write command having "A" as destination, from I directly to disk drive Z without proceeding through A, and (2) disk drive Z has been "advised" or commanded to substitute initiator "I" as the source for write requests which arrive at Z actually by way of A.

Returning, now, to the syntactical description of FIG. 4, disk drive Z responsive to proxy command PW5(A, Z, 1)(I, S) issues a transfer ready signal or command identified as X6(A, I, 1) which is interpreted as follows: "X" means transfer; "6" is the number corresponding to this sixth communication step in the same originator's exchange process; (source ID is A; destination ID is I; and this is still the same Write request identified by originator's exchange "1"). This transfer ready command goes through switch 402 and via the communicative link syntactically identified as X7(A, I, 1) is transferred to its destination, Initiator I, "advising" initiator I that conditions are ready for data to be written. Initiator I, responsive to this transfer ready command, sends data to switch 402 via the communicative link syntactically identified as D8(I, A, 1), which stands for: data, the eighth step count in this process, (source is I, destination is A, and same write request #1) respectively. The destination was italicized in the prior sentence to emphasize that A shall not receive this data despite destination "A" being designated in the syntax because of map conditions earlier established in the switch (which will be discussed below). In response to the map operation in the switch to be described below, the switch detects a match involving disk drive Z and certain frame header elements, substitutes disk drive Z for aggregator A 403 in the header's D_ID field, and sends this data directly to disk drive Z via communicative link identified by D9(I,Z, 1). Disk drive Z then completes the proxy write command by issuing back to aggregator A a status signal identified as S10(Z, A, 1) where Z is source, A is destination, etc. This status signal goes through the switch and via the link identified by S11(Z, A, 1) from the switch to A where it provides a status report to A that the write was successfully completed. At this point, A can dismantle or neutralize the map table it established in the switch, whereupon it issues an "unmap" command UM12(I, A, 1) to the switch and the map table is dismantled whereby its operational effect is neutralized.

In other words, in the last paragraph and the operation of FIG. 4 thus far, it should be understood that the transfer ready signal advised the computer that conditions are ready for data to be transferred, and that the computer sent the data addressed to the aggregator A, via D8(I, A, 1). Because of the switch's intelligence it "decided" to not allow this write command to flow to the aggregator, and diverts it by way of the map table directly to disk drive Z on link identified as D9(I, Z, 1). After the status report is made from the disk drive via the switch to the aggregator, the aggregator decides to dismantle the map table which it no longer needs for this particular write command, via unmap command UM12(I, A, 1).

It can be seen that all destination ID's for host-originated commands are the aggregator A, as in (note the bold emphasis) W1(I, A, 1) and D8(I, A, 1), and, all source ID's for host-received commands are aggregator A, as in (again note bold emphasis) X7(A, I, 1) and S14(A, I, 1). These results obtain even though the transfer ready command originates on disk drive Z and not A and even though the data command causes data to be written into disk drive Z and not A. Therefore, from the host's viewpoint, nothing has changed with respect to the switch or the aggregator with which it is connected! This entire proxy operation in redirecting commands directly to specific disk drive components is not perceptible by the host.

All commands and signals except for possibly the map/unmap and proxy commands are standard fibrechannel level FC-2 compatible commands. Accordingly, since the syntax of all information transmitted in FIG. 4 (except for possibly map/unmap and proxy commands) is solely reflective of fields in the frame header, all such information with possible exceptions noted can fit within the frame header. This embodiment of the present invention takes advantage of the potential afforded by the frame header to insert proxy commands into the header to achieve this important result in latency reduction. Typically, map/unmap commands can be fabricated at the SCSI (small computer system interface) level, or could be at the microcode level in assembler language; alternatively, they can also be FC-2 compatible. In any case, they would be compatible with the fibrechannel switch internals. Furthermore, the proxy commands are proprietary SCSI upper level protocol commands which map to SCSI lower level protocol commands, which are, in turn, mapped onto communications media dependent protocols such as the FC-2 protocol layer.

All write command activity shown in FIG. 4 was executed with respect to disk drive Z because of a decision made by the aggregator to use disk drive Z. However, it could have selected disk Y or, alternatively, could have decided to alternate host-initiated write and/or read commands between disk drives Z and Y (and any other disk drives in the system not shown in this FIG.) and permit the system to process these commands virtually in parallel. In the latter alternative case the map operation(to be discussed below) could be extended to include sequence count and sequence ID information from the frame header where the map operation would be more complex. Such syntax would take the following form:

Map(S_ID, D_ID, OX_ID, SEQ_ID, SEQ_CNT) [(Proxy x_ID), x]

where all items have been previously identified.

Figure 8:
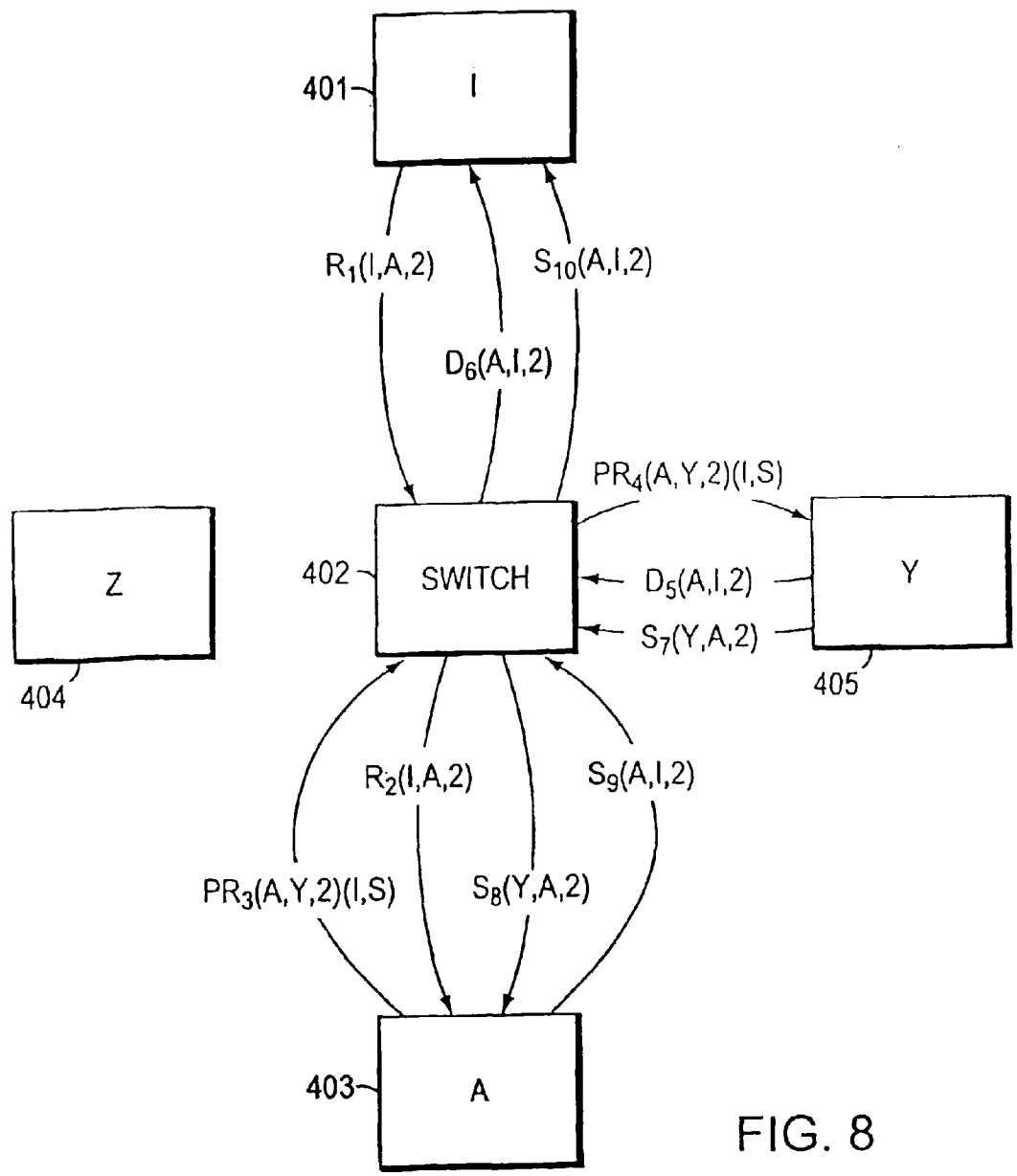

FIG. 8—Read Command Operation

A read command example would be similar to the write command example shown, but a map command is not needed because the switch does not need to be involved in the proxy operation for read commands. The transfer ready command is also not needed in a read example because the relationship between (initiator) host computer and (target) disk drive is that the latter drives the sequencing. The host initiator is assumed to be ready, since it initiated the read request. So after the read request is issued, whenever the (target) disk drive is ready to send data, it does. Referring to FIG. 8, there is presented the same schematic block diagram of a computer system as used in FIG. 4, and employing the same syntax, but where disk drive Y, drive 405, is used in this read example instead of reusing disk drive Z, drive 404, for purposes of clarity of presentation. As in the write example, Initiator 401 forwards a read command syntactically identified as R1(I, A, 2) with the usual meaning: R=a read request, 1=the first command in this series, (I=Initiator is the source of the command, A=Aggregator is the destination of the command, and 2=the second originator's exchange). This read request flows through the switch and via a link identified syntactically as R2(I, A, 2) is received by aggregator 403. The aggregator responds by turning the read command into a proxy read request: PR3(A, Y, 2)(I, S) which travels through the switch to disk drive Y via the link identified by PR4(A, Y, 2)(I, S). In this proxy command, PR=proxy read; 4=the fourth command of this originator's exchange; (A=actual source aggregator; Y=actual destination disk drive Y; 2=second originator's exchange)(I= Initiator as the proxy, and S="Source", meaning that the aggregator is identifying or substituting the proxy Initiator in the role of source to disk drive Y). Disk drive Y retrieves the data from within its storage and delivers it to the switch over the link identified by syntax: D5(A, I, 2), where, as reflected by "A" being in the source position of the syntax, disk drive Y is responding in the role of aggregator as source of the data command thus conforming itself to the appropriate component that would have just received a command from the Initiator, namely, the aggregator. The switch forwards the data to I via the link identified by D6(A, I, 2). (Note that "A" is still designated the source although "Y" is the actual source of this data.) Drive Y issues a status confirmation via link identified by S7(Y, A, 2) through the switch and via the link identified by S8(Y, A, 2) to the aggregator. The aggregator issues a status confirmation to the Initiator via the link identified by S9(A, I, 2) through the switch and via the link identified by S10(A, I, 2) to the initiator. The major difference(s) between this read example and the prior write example is that the switch does not need to redirect any commands in the read example. Therefore the map command is not needed (and thus the unmap command is not needed).

Focusing on the proxy read command PR3(A, Y, 2)(I, S) or its continuation PR4(A, Y, 2)(I, S) and the responsive data command D5(A, I, 2) or its continuation D6(A,I,2), the significance of the functionality expressed by the syntax should not be overlooked. These commands mean that the aggregator (which would have otherwise been the source with respect to disk drive Y in an ordinary read command) is sending this read command to the disk drive Y (which would have otherwise been the destination with respect to the aggregator in an ordinary read command) and is herewith syntactically identified within the proxy command PR3(A, Y, 2)(I, S) in bold italics. But, this command is a proxy command and is thus sending additional information identified in the proxy portion of the command "PR3(A, Y, 2)(I, S)", again in bold italics. The additional information is a request to substitute the initiator as the source of this command. This complete proxy command is received by Disk drive Y which cooperates and makes that substitution. The result of this cooperation is observable in the responsive data command output by disk drive Y. Disk drive Y sends the data not back to A, the actual source of the command, but to I, the proxied or substituted source of the command, and identifies itself in the data command as aggregator A. Examining the syntax for the data command one observes that the aggregator is in the position of the source, and the initiator is in the position of the destination. The net effect of these substitutions is that: (1) an additional hop through the aggregator is avoided when data is forwarded from a disk drive responsive to a read request from the initiator—data goes directly to the initiator (albeit through the switch or network) from the drive rather than (again via the switch) back through the aggregator from which the command actually was received, and (2) the host initiator is not impacted since the commands it sends and receives do not suggest anything other than what the host had expected—requests made by and directed from the initiator host to the aggregator as a destination, and data received by the host initiator from the aggregator as a source! Thus, "the host is not in the game", using a colloquial expression to highlight the fact that other components or sub systems in this overall network attached storage system are cooperating or conspiring in a manner to improve throughput and improve other system performance characteristics without the host being aware of these changes, or substitutions, or proxies. And, as noted with the earlier discussed write example, this entire proxy operation is not perceptible by the host.

FIG. 5

Figure 5:
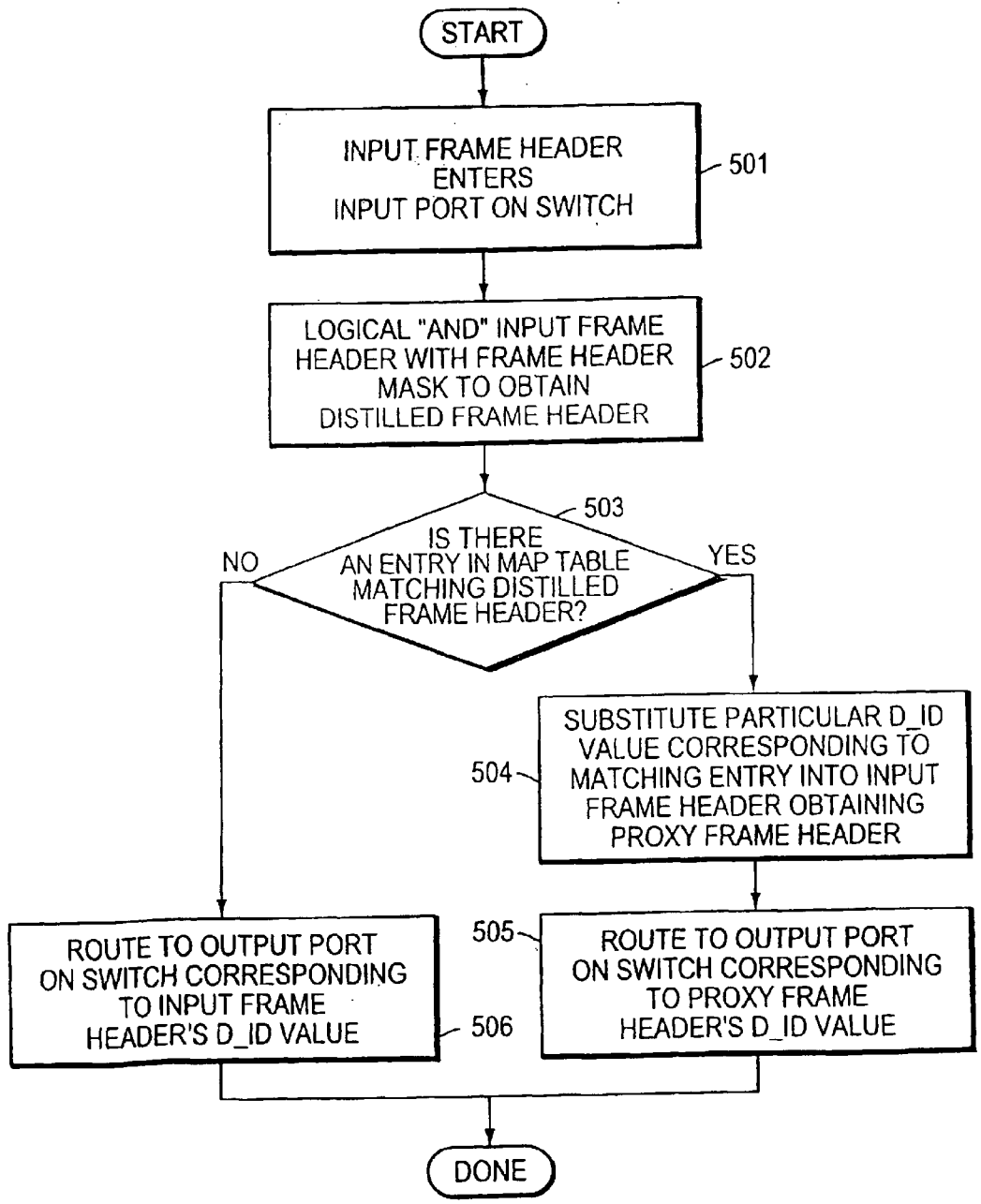
FIG. 5 is a flowchart depicting the algorithmic process performed by the embodiment of the present invention of FIG. 4.

Referring next to the flowchart of FIG. 5, it depicts the algorithmic process inherent in operation of switch 402 in the computer system of FIG. 4 for the write command example illustrated. An input frame header (including its complete frame for which the header is identifying information) from the host computer enters an input port on the switch in block 501. It is to be understood that there can be multiple hosts each sending write and/or read commands to this complex switch on its multiple input ports essentially simultaneously, and the switch under control of its aggregator shall be able to process all inputs appropriately. (This singular example of a write command is hereby disclosed for purposes of enhancing clarity of presentation and understanding of operation of the present invention. The corresponding flowchart for the read example would be less complex than this because there is no map table operation associated with the read command.) The algorithmic process moves to block 502 wherein a logical "AND" is performed between the input frame header received and a frame header field selector such as a frame header mask. The mask (more detail of which is presented below in connection with FIG. 7) is a template allowing only information relevant to this process. In other words, there are fields in the fibrechannel FC-2 frame header that may contain information irrelevant to operation of the present invention, and they are filtered out. The result of this logical "AND" step is information equal to or less than the mask information, i.e. a subset of the mask information termed a "distilled frame header". The algorithmic process moves then to decision block 503 wherein the query is presented: is there an entry (i.e.: a set of frame header fields) in the map table matching the distilled frame header? This map table, earlier referred to in connection with description of FIG. 4 and to be described in more detail in connection with FIG. 7 hereinbelow, is a dynamic table established in the switch. If the answer is "no", the process moves to block 506 which routes the entire frame associated with the distilled frame header to the destination identified by the original D_ID value in the header, which is a particular output port on the switch and the process is done. On the other hand, if the answer is "yes", then there is a match between the distilled frame header and a particular frame header entry in the map table and the algorithmic process moves to block 504 where a substitution takes place. The particular D_ID value corresponding to the matching entry (set of fields) in the table is substituted into the D_ID field in the input frame header in place of the original value thus obtaining a "proxy" frame header. In other words, the result of this operation is a changed input frame header associated with the write command, this change taking place within the switch: the frame header was first "distilled" whereby irrelevant header information for this process was removed, and then the input frame header had its destination changed to this proxy destination. (In summary, Proxy D_LD replaces the header field D_ID and Proxy S_ID replaces the header field S_ID when they are used.) The algorithmic process moves next to block 505 where the complete input frame, for which the proxy frame header is its identification, is routed to a different particular output port on the switch corresponding to the proxy frame header's D_ID value and the process is done. This means that data associated with this write command will be sent to a destination different from that originally intended, namely directly to a disk drive rather than the aggregator, and this change will take place within the switch.

FIG. 6

Figures 6, 7:
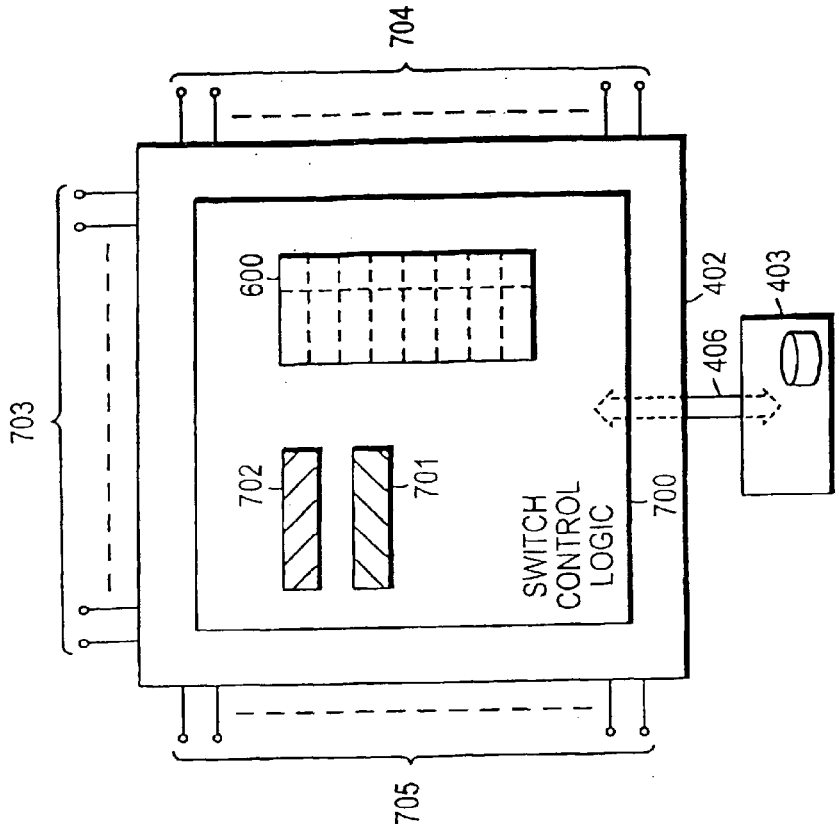
FIG. 6 depicts a map table listing certain sets of frame header fields associated with their respective proxy destination IDs.
FIG. 7 is a schematic diagram of the switch of FIG. 4 showing its switch control logic including the map table of FIG. 6 under command of the aggregator of FIG. 4; and, FIG. 8 is a schematic diagram of a read command processed in accordance with an embodiment of the present invention.

Referring next to FIG. 6, map table 600 is presented. This is a table which exists dynamically in fibrechannel switch 402. In other words, this table can be created, table entries can be changed, and the table can be deleted by operation of hardware, firmware, and/or software in the switch and controlled by the switch which is, in turn, controlled by aggregator 403. More detail on this operation will be given with respect to FIG. 7 hereinbelow. The table shown has two main columns, the one on the left being sets of Frame Header Fields and the other on the right being Proxy D_ID's. In the Frame Header Fields column are sub columns for S_ID, D_ID, and OX_ID. More sub columns could be entered as may be needed, as for example, entering SEQ_ID and SEQ_CNT to accomodate the disk Z/disk Y alternating scheme described earlier where sequence identity and sequence count are additional fields needed to implement the alternating scheme. Furthermore, this particular table as depicted contains entries that are reflective of the write operation described in connection with FIG. 4 and FIG. 5. The first row, for example, shows a set of earlier discussed values for S_ID, D_ID and OX_ID being associated with a Proxy destination ID known as D_ID"a". Other sets of entries in the table may show different values for S_ID reflective of multiple computer hosts (up to "n" computer hosts) and different values for OX_ID reflective of multiple write commands per host (up to "M" number of originator's exchange write commands with computer host "1", up to "N" number of originator's exchange write commands with computer host "2", and up to "P" number of originator's exchange write commands with computer host "n"). Each of these sets of entries is associated with a particular destination ID as suggested by the column heading, e.g. a particular disk drive. Thus this column under Proxy D_ID's contains a range of destination IDs running; from D_ID"a" to D_ID"zzz" as shown. This nomenclature is intended to be suggestive of a large number of destination IDs and no particular fixed or limited number is intended to be represented hereby. Each of these destination IDs necessarily maps to a particular output port on the switch which connects to an appropriate disk drive. More discussion about this table will be provided in connection with FIG. 7.

FIG. 7

Referring next to FIG. 7, switch 402 is shown with input ports 703, output ports 704 and 705, and containing, among other things, its switch control logic 700. Among other logic components not shown, switch control logic contains map table 600, frame header field selector or mask 701 and input frame header buffer 702. Map table 600 is the table described in FIG. 6. Header mask 701 and buffer 702 are dynamic constructs which can be implemented or dismantled, and are fashioned from computer hardware, firmware, and/or software within and/or related to the switch. Aggregator 403 commands control logic 700 by way of control port 406 Those skilled in the art and familiar with fibrechannel switches will appreciate how such control logic may be implemented from hardware, firmware and software.

In operation, if a write command is forwarded by a host to switch 402, it enters on one of input ports 703. This command is a full frame in fibrechannel protocol as shown in FIG. 3B. As it enters the switch, its header field as shown in FIG. 3C is loaded into header buffer 702, and if there is no prior-established proxy condition where there is no proxy match, the full frame is conducted to aggregator 403. Aggregator 403, as an overseer or manager for multiple disk drives, is aware of the state of activity and traffic regarding all of its disk drives, and makes a decision regarding if it would be in the computer system's overall best interest to (1) have this write command pass through itself to the disk array and then have such command's associated data also pass through itself on its way to the disk drive array, or (2) arrange for a proxy ID so that such data shall pass from the host computer into the switch and then written directly into the disk to avoid a bottleneck in the aggregator. Assuming the aggregator decides for a proxy ID, it sends a map command via control port 406 to switch 402 which requests the switch to fabricate input header mask 701. The aggregator signals to the switch in this command precisely what elements should be put into the mask based on existing conditions and on the requirement of handling a write command from the host. Additionally, the aggregator also had commanded the switch control logic in this map command to fabricate map table 600 with specific frame header field sets of entries with their corresponding proxy destinations based on existing conditions and on the requirement of handling a write command. Thereupon, the aggregator commands the switch control logic to compare the distilled header mask with the frame header field map table's sets of entries to seek a match and to select the Proxy D_ID associated with that matched entry set as the new switch destination ID for data to be sent by the computer and to be written into the disk drive array. Accordingly, when data is sent by the host [syntax D8(I, A, 1) in FIG. 4] to aggregator 403 responsive to a transfer ready command from the specified disk drive [syntax X6(A, I, 1)] it first goes to the switch and then by prearranged proxy just described goes directly to disk drives and not to the aggregator.

Those skilled in this art including those directly connected with design and development of fibrechannel switches will recognize the fact that implementation of illustrative embodiments of the present invention is within their skills and expertise and will utilize appropriate hardware, firmware, and software to generate the logic to accomplish these implementations. For example, a typical host computer which can be used in connection with the present invention is any Intel, Sun Microsystems, Hewlett Packard or other similar company's computer using a fibrechannel host bus adapter with fabric support. A typical fibrechannel switch which might be used in connection with the present invention and which can be fully implemented for Map/Unmap operations can be obtained from companies such as Brocade, McData, Vixel, or Ancor, etc. Typical disk drives which can be used in connection with the present invention are: any fibrechannel disk drive modified to support proxy read and proxy write. The frame header buffer, map table, frame header mask, and map/unmap commands would typically be implemented by combination of software and hardware in or related to the switch. Aggregator 403 can typically be derived from EMC CLARiiON model nos. 4700 which could have the capabilities called for herein. Furthermore, the specific illustrative embodiments presented are not the only ways of fabricating the present invention. For example, other ways of utilizing a fibrechannel switch to accomplish the goals of the present invention include use of hash table lookups for efficient access to a map table.

In a hash table lookup design, decision block 503 in FIG. 5 could be a hashing algorithm. Hashing can take different forms. One form could be to mask off all bits in a field except some bits; the unmasked bits could be either high, or low, or mid order bits. The unmasked bits are used as an index, as an approximation to get to the general area of the correct answer very quickly. An alternative hashing design would take all bits in the field but would fold them together to obtain a smaller number of bits, again to accomplish the very fast approximation objective. There are other hashing designs as well. In any of these hashing designs one can avoid an exhaustive search, entry by entry, using the distilled frame header and each entry set of fields in the map table, as earlier presented. A hashing approach in connection with such a table would provide an output advising whether or not any matches existed in the sampled subset of the table—and if not then the search could move on quickly to the next sampling of entries.

The present embodiments are therefore to be considered in all respects as illustrative and not restrictive. For example, the invention need not use a fibrechannel switch; any functionality that is the equivalent of such a switch, such as Infiniband could be utilized with the present invention. The scope of the invention is indicated, therefore, by the appended claims rather than by the foregoing description, and all changes which come within the meaning and range of equivalency of the claims are therefore intended to be embraced therein.

What is claimed is:

1. A storage system for storing data for at least one host computer, said system comprising:
   a plurality of disk drives for storing and supplying said data;
   a switch having a plurality of input and output ports, said switch being connected between said plurality of disk drives and said at least one host computer for at least connecting one of said input ports on which said data was received to one of said output ports;
   an aggregator connected to said switch for at least managing operation of said plurality of disk drives; and,
   operation coordinating logic operatively coupled to coordinate operation of said plurality of disk drives, said switch, and said aggregator in a manor to control flow of certain of said data between said at least one host computer and said plurality of disk drives to be through said switch and not through said aggregator and in a manner which does not change the operation of said at least one said host computers, the operation coordinating logic, when conveying data between a host computer and a disk drive, being configured to:
   selectively (i) direct data exchanged between the host computer and the disk drive through the aggregator to improve security for the data, and (ii) divert the data exchanged between the host computer and the disk drive so that the data does not proceed through the aggregator to reduce latency.

2. The storage system of claim 1 and wherein said switch is a fibrechannel switch and said operation coordinating logic utilizes protocol including fibrechannel protocol.

3. The storage system of claim 2 and wherein said fibrechannel protocol includes fibrechannel FC2 frame headers.

4. The storage system of claim 3 and wherein each of said frame headers has a predetermined set of information fields.

5. The storage system of claim 4 and wherein said fields include but are not limited to destination ID, source ID, sequence ID, sequence count, originator's exchange ID, and respondent's exchange ID.

6. The storage system of claim 5 and wherein said operation coordinating logic includes mapping logic for generating a mapping command designating said host computer as said source ID, said aggregator as said destination ID and first particular said originator ID, and further having a mapped destination ID which designates a particular one of said plurality of disk drives which is connected to a particular one of said output ports.

7. The storage system of claim 6 and wherein said operation coordinating logic includes unmapping logic for generating an unmapping command designating said host computer as said source ID, said aggregator as said destination ID and said first particular said originator ID whereby the effect of the operation of said mapping command is neutralized.

8. The storage system of claim 7 and wherein said operation-coordinating logic includes transfer-ready logic for generating a transfer-ready command having said aggregator as said source ID, said host computer as said destination ID, and said first particular said originator ID.

9. The storage system of claim 7 and wherein said host computer generates data having said host computer as said source ID, said aggregator as said destination ID, and said first particular said originator ID.

10. The storage system of claim 6 and wherein said operation coordinating logic includes proxy logic for generating a proxy command having said aggregator as said source ID, said particular one of said plurality of disk drives as said destination ID, and said first particular originator ID, and further having a proxy destination ID which designates a particular said at least one host computer.

11. The storage system of claim 5 including logic for selecting said certain of said data to obtain particular data words and wherein each of said words is operated upon by said operation-coordinating logic in a manner to steer said each of said such words directly to a particular one of said plurality of disk drives.

12. The storage system of claim 1 wherein the operation coordinating logic, when diverting the data exchanged between the host computer and the disk drive so that the data does not proceed through the aggregator to reduce latency, is configured to:
   receive a write command from the host computer;
   send a proxy command to the disk drive in response to the write command, the proxy command directing the disk drive to (i) bundle a Transfer Ready command in a communication that identifies the aggregator as a source of the communication and the host computer as a destination of the communication and (ii) provide the communication to the host computer so that the communication does not proceed through the aggregator.

13. The storage system of claim 1 wherein the operation coordinating logic, when diverting the data exchanged between the host computer and the disk drive so that the data does not proceed through the aggregator to reduce latency, is configured to:
   receive a read command from the host computer;
   send a proxy command to the disk drive in response to the read command, the proxy command directing the disk drive to (i) bundle the data in a communication that identifies the aggregator as a source of the communication and the host computer as a destination of the communication and (ii) provide the communication to the host computer through the switch in a manner that diverts the communication so that the communication does not proceed through the aggregator.

14. A computer data storage system wherein said data is grouped in frames, comprising:
   a plurality of disk drives for storing and retrieving said data;
   an aggregator for managing operation of said plurality of disk drives;
   each of said frames including a header containing binary fields designating parameters including at least destination ID, said header being associated with that portion of said data contained within said each of said frames; and,
   a switch connected between a host computer, said disk drives, and said aggregator for both controllably selecting certain ones of said frames and flowing said portion of said data grouped in said certain ones and having said aggregator as said destination ID directly between said host computer and said plurality of disk drives, whereby data transfer through said aggregator is avoided for said certain ones of said frames, the aggregator being associated with circuitry configured to:
selectively (i) direct data exchanged between the host computer and the disk drive through the aggregator to improve security for the data, and (ii) divert the data exchanged between the host computer and the disk drive so that the data does not Proceed through the aggregator to reduce latency.

15. The system of claim 14 and wherein said switch includes, as the circuitry associated with the aggregator, switch control logic arranged to be commanded by said aggregator to selectively switch said certain ones of said frames directly between said host computer and said plurality of disk drives and all other of said frames indirectly therebetween through said aggregator.

16. The system of claim 15 and wherein said switch control logic includes a frame header field selector, an input frame header buffer, and a map table.

17. The system of claim 16, and wherein said frame header field selector is a frame header mask.

18. The computer data storage system of claim 14 wherein the circuitry associated with the aggregator, when diverting the data exchanged between the host computer and the disk drive so that the data does not proceed through the aggregator to reduce latency, is configured to:
receive a write command from the host computer;
send a proxy command to the disk drive in response to the write command, the proxy command directing the disk drive to (i) bundle a Transfer Ready command in a communication that identifies the aggregator as a source of the communication and the host computer as a destination of the communication and (ii) provide the communication to the host computer so that the communication does not proceed through the aggregator.

19. The computer data storage system of claim 14 wherein the circuitry associated with the aggregator, when diverting the data exchanged between the host computer and the disk drive so that the data does not proceed through the aggregator to reduce latency, is configured to:
receive a read command from the host computer;
send a proxy command to the disk drive in response to the read command, the proxy command directing the disk drive to (i) bundle the data in a communication that identifies the aggregator as a source of the communication and the host computer as a destination of the communication and (ii) provide the communication to the host computer through the switch in a manner that diverts the communication so that the communication does not proceed through the aggregator.

20. A network-attached storage system, comprising:
an aggregator device;
a set of storage devices; and
a switch coupled to a host computer, the aggregator and the set of storage devices; the aggregator device including aggregator circuitry configured to organize the set of storage devices into an aggregation and specialized logic configured to decide whether data exchanged between the host computer and the set of storage devices flows through the aggregator device; the specialized logic, in response deciding whether data exchanged between the host computer and the set of storage devices flows through the aggregator device, being configured to selectively one of: (i) direct the data exchanged between the host computer and the set of storage devices through the aggregator device, and (ii) divert the data exchanged between the host computer and the set of storage devices so that the data does not proceed through the aggregator device.

21. The network-attached storage system of claim 20 wherein the specialized logic, when diverting the data exchanged between the host computer and the set of storage devices so that the data does not proceed through the aggregator device, is configured to:
receive a write command from the host computer;
send a proxy command to the set of storage devices in response to the write command, the proxy command directing the set of storage devices to (i) bundle a Transfer Ready command in a communication that identifies the aggregator device as a source of the communication and the host computer as a destination of the communication and (ii) provide the communication to the host computer so that the communication does not proceed through the aggregator device.

22. The network-attached storage system of claim 21 wherein the set of storage devices is configured to:
receive the proxy command from the specialized logic, bundle the Transfer Ready command in the communication that identifies the aggregator device as a source of the communication and the host computer as a destination of the communication and provide the communication to the host computer through the switch so that the communication does not proceed through the aggregator device.

23. Network-attached storage system of claim 20 wherein the set of storage devices is configured to:
receive a read command from the host computer;
send a proxy command to the set of storage devices in response to the read command, the proxy command directing the set of storage devices to (i) bundle the data in a communication that identifies the aggregator device as a source of the communication and the host computer as a destination of the communication and (ii) provide the communication to the host computer through the switch in a manner that diverts the communication so that the communication does not proceed through the aggregator device.

24. The network-attached storage system of claim 21 wherein the set of storage devices is configured to:
receive the proxy command from the specialized logic, bundle the data in the communication that identifies the aggregator device as a source of the communication and the host computer as a destination of the communication and provide the communication to the host computer through the switch so that the communication does not proceed through the aggregator device.

25. The network-attached storage system of claim 20 wherein the specialized logic is configured to selectively decide that (i) the data exchanged between the host computer and the set of storage devices flows through the aggregator device to improve security for the data through the network-attached storage system, and (ii) the data exchanged between the host computer and the set of storage devices does not flow through the aggregator device to reduce latency of the data through the network-attached storage system.

* * * * *